(12) United States Patent
Yasui et al.

(10) Patent No.: US 6,291,948 B1
(45) Date of Patent: Sep. 18, 2001

(54) IMAGE DISTORTION CORRECTION CIRCUIT

(75) Inventors: Hironobu Yasui; Akinori Heishi; Yoshinori Miyamoto; Akira Ishimori; Hiroaki Nishino, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/694,810

(22) Filed: Oct. 24, 2000

(30) Foreign Application Priority Data

May 8, 2000 (JP) .................................. 12-134623

(51) Int. Cl.$^7$ ...................................... G09G 1/28
(52) U.S. Cl. ................. 315/368.26; 315/368.27; 315/368.28; 315/368.25; 315/408; 315/3; 315/399
(58) Field of Search ............ 315/3, 364, 368.25, 315/368.26, 368.28, 399, 408

(56) References Cited

U.S. PATENT DOCUMENTS

| | | | |
|---|---|---|---|
| 5,548,190 | * | 8/1996 | Okuyama et al. .............. 315/368.26 |
| 5,998,943 | * | 12/1999 | Tanizoe ................................. 315/370 |
| 6,222,329 | * | 4/2001 | Kikuchi et al. ....................... 315/399 |

FOREIGN PATENT DOCUMENTS

| | | | |
|---|---|---|---|
| 2561541 | 9/1996 | (JP) | ................................. H04N/3/23 |
| 9149283 | 6/1997 | (JP) | ................................. H04N/3/23 |
| 11261839 | 9/1999 | (JP) | ................................. H04N/3/23 |

* cited by examiner

Primary Examiner—Don Wong
Assistant Examiner—Jimmy T. Vu

(57) ABSTRACT

An image distortion correction circuit is provided in which a horizontal deflection current (IH) flows through horizontal correction coils (L1, L2) and a vertical deflection current (IV) flows through either of vertical correction coils (L3, L4). The vertical correction coils (L3, L4) and the horizontal correction coils (L1, L2) are wound on the same core (4). A pair of magnets (2, 3) on opposite ends of the core (4) apply a biased magnetic field from the north pole toward the south pole. The anode of a diode (D1), the cathode of a diode (D2) and a first end of a resistor (R1) are connected to an intermediate terminal (P11) through which the vertical deflection current (IV) flows. A first end of the vertical correction coil (L3) is connected to the cathode of the diode (D1). A second end of the resistor (R1) and a terminal (P4) are connected to a second end of the vertical correction coil (L3). A first end of the vertical correction coil (L4) is connected to the terminal (P4), and a second end of the vertical correction coil (L4) is connected to the anode of the diode (D2). The image distortion correction circuit minimizes the degradation of vertical deflection sensitivity to perform an intermediate pin distortion correction.

5 Claims, 3 Drawing Sheets

F I G . 3
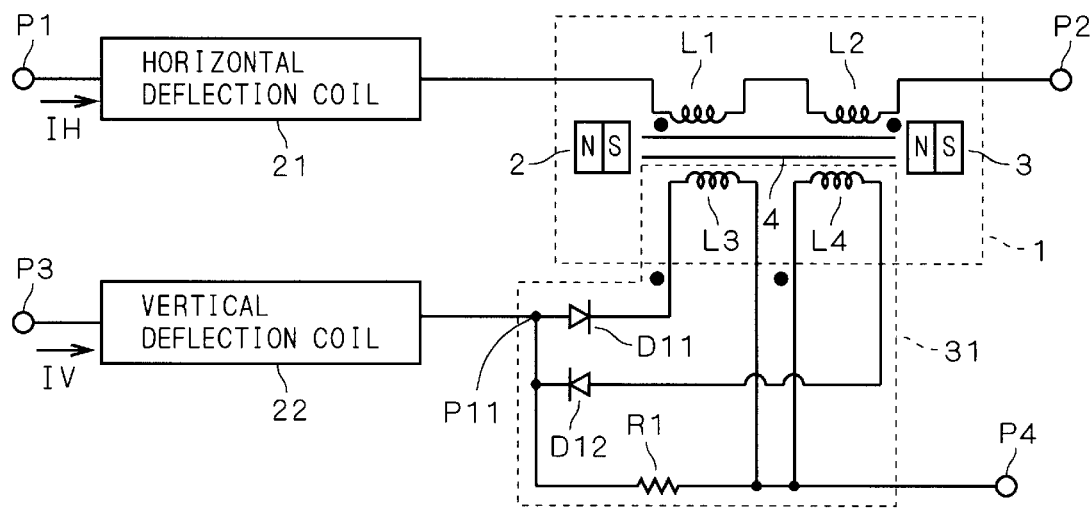
F I G . 4
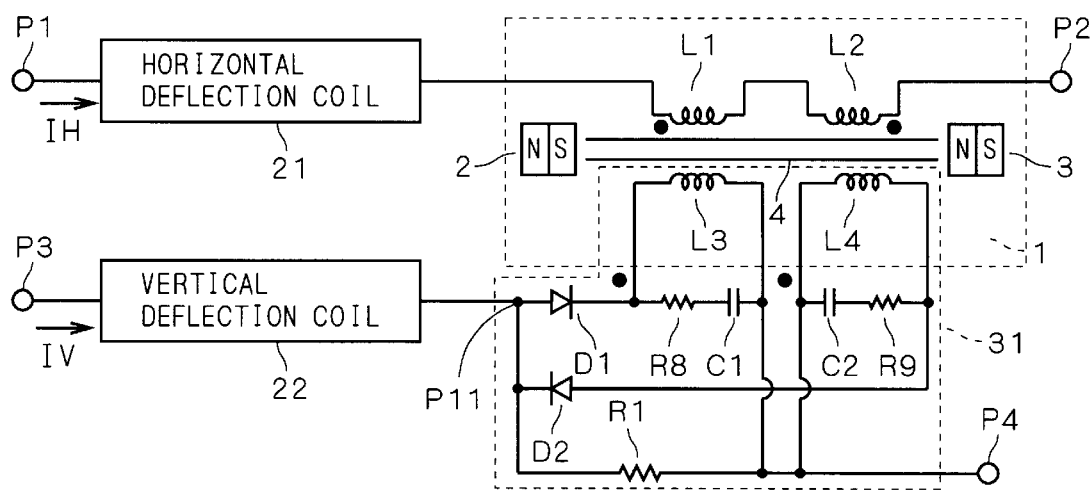

IMAGE DISTORTION CORRECTION CIRCUIT

BACKGROUND OF THE INVENTION

1. Field of the Invention

The present invention relates to an image distortion correction device for a CRT (cathode ray tube) for use in a television receiver, a display monitor and the like.

2. Description of the Background Art

In a television receiver and a display monitor which employ a CRT, a distortion known as a pincushion distortion occurs in a picture projected on a front screen by deflecting an electron beam since the front screen (phosphor screen) is near flat to result in different distances between the deflection center to the phosphor screen. Various pincushion distortion correction circuits have been proposed to correct the pincushion distortion.

The front screen which is near flat results in a greater distance from the deflection center to a peripheral part of the phosphor screen than to a central part thereof. Assuming that the front screen is a flat screen, a change in deflection current and a displacement X(t) (t is a time variation) of a bright spot position on the screen are proportional to tan θ where θ is a deflection angle. Thus, a peripheral elongation which is a phenomenon in which the amount of horizontal deflection increases toward the ends of the screen occurs, and a picture has a poor linearity in the peripheral part of the screen of the CRT. To correct the peripheral elongation distortion, an S-correction circuit is used which causes an S-shaped horizontal deflection current that decreases in the peripheral part to flow to reduce the horizontal deflection current in the peripheral part of the CRT face.

The required amount of correction in the S-correction circuit in the television receiver or the display monitor which employ the CRT is inversely proportional to the distance from the deflection center to each spot on the screen, and varies depending on the positions on the screen. Upper and lower parts of the CRT front screen having a large radius of curvature are farther from the deflection center than a central part thereof and accordingly requires a smaller amount of S-correction. However, conventional S-correction circuits do not particularly take the vertical correction of the screen into account to cause more excessive S-correction in the upper and lower parts of the screen than in the central part thereof, resulting in intermediate vertical lines bent in the shape of a pincushion. Such a distortion is referred to as an intermediate pin distortion (inner vertical line pincushion distortion). Conventional pincushion distortion correction circuits are not capable of completely correcting the intermediate pin distortion.

In recent years, the deflection angle has tended to increase because of the trend in the CRT front screen toward a flat shape. As compared with the CRT front screen having a large radius of curvature, the flat CRT front screen requires the entirely increased amount of S-correction and also has an increased difference between the upper and lower parts of the screen and the central part thereof in distance from the deflection center. As a result, the flat CRT front screen has more remarkable intermediate pin distortion and is required to overcome such a problem.

To correct the intermediate pin distortion, various intermediate pin distortion correction devices have been proposed, such as those disclosed in Japanese Patent Application Laid-Open No. 9-149283 (1997) and Japanese Patent Application Laid-Open No. 11-261839 (1999).

FIG. 5 is a circuit diagram showing a schematic circuit arrangement of a background art intermediate pin distortion correction device disclosed in Japanese Patent Application Laid-Open No. 11-261839. As illustrated in FIG. 5, a horizontal deflection current IH flows between terminals P1 and P2, and a horizontal deflection coil 21, a horizontal correction coil L13 and a horizontal correction coil L14 are connected in series between the terminals P1 and P2. The horizontal correction coils L13 and L14 are wound on the same core 13. The horizontal deflection coil 21 may be constructed in various configurations, such as a single coil and a plurality of coils connected in parallel, and thus is indicated by a block for convenience.

A vertical deflection current IV flows between terminals P3 and P4, and a vertical deflection coil 22 is connected between the terminal P3 and an intermediate terminal P11. The vertical deflection coil 22 may be constructed in various configurations, such as a single coil and a combination circuit of a plurality of coils connected in series and a plurality of resistors (including a variable resistor) for balance correction, and thus is indicated by a block for convenience.

The anode of a diode D3 and a first end of a resistor R4 are connected to the intermediate terminal P11. A first end of a vertical correction coil L15 and the cathode of a diode D4 are connected to the cathode of the diode D3. A second end of the resistor R4 and a first end of a resistor R5 are connected to a second end of the vertical correction coil L15. The anode of the diode D4 and a second end of the resistor R5 are connected to the terminal P4. The vertical correction coil L15 is wound on the core 13.

An intermediate pin distortion correction saturable reactor unit 10 comprises the horizontal correction coils L13, L14, the vertical correction coil L15, magnets 11 and 12 and the core 13. The magnets 11 and 12 are disposed on the opposite ends of the core 13 so that a magnetic field is biased in one direction (leftwardly in FIG. 5). The horizontal correction coils L13 and L14 are wound in opposite directions so as to generate oppositely directed magnetic fields. The vertical correction coil L15 is wound in such a direction as to generate a magnetic field in a direction opposite from the direction of the bias applied by the magnets 11 and 12.

The intermediate pin distortion correction saturable reactor unit 10 in the intermediate pin distortion correction device of FIG. 5 is intended to control the inductance of the horizontal correction coils L13 and L14 through which the horizontal deflection current IH flows in accordance with the vertical deflection current IV flowing through the vertical correction coil L15, to change the amount of S-correction for horizontal deflection in accordance with the amount of vertical deflection.

More specifically, the horizontal correction coils L13 and L14 are connected to one end of the horizontal deflection coil 21, and the vertical correction coil L15 which carries the vertical deflection current IV varying in a cycle of vertical scanning (vertical cycle) generates a magnetic field directed to cancel the magnetic field biased by the magnets 11 and 12, thereby to change the inductance of the horizontal correction coils L13 and L14, performing the intermediate pin correction on the left and right sides of the screen. In this process, the horizontal deflection current IH applied to the two horizontal correction coils L13 and L14 is an S-corrected sawtooth current given for each horizontal scanning cycle, and the vertical deflection current IV applied to the vertical correction coil L15 is a sawtooth current given for each vertical scanning cycle and rectified in two current paths comprised of the two diodes D3 and D4 and the two resistors R4 and R5.

As described above, CRTs for the television receiver and the display monitor are required to prevent image quality degradation resulting from the intermediate pin distortion on the left and right sides of the screen, and various attempts to meet the requirement have been proposed. However, the background art intermediate pin distortion correction device shown in FIG. 5 has a circuit configuration in which a vertical correction section 32 comprising a rectifier circuit having the two diodes D3, D4 and the two resistors R4, R5, and the vertical correction coil L15 is connected in series with the vertical deflection coil 22 to rectify the vertical deflection current IV flowing through the vertical correction coil L15 in the intermediate pin distortion correction saturable reactor unit 10.

This increases the impedance of the vertical correction section 32 which carries the vertical deflection current IV, resulting in lowered vertical deflection sensitivity.

SUMMARY OF THE INVENTION

According to a first aspect of the present invention, an image distortion correction circuit comprises: first and second horizontal correction coils in a horizontal deflection current path through which a horizontal deflection current flows, the first and second horizontal correction coils being connected in series with each other and being wound in such directions as to generate oppositely directed magnetic fields respectively; magnetic field biasing means for biasing the magnetic fields in a first direction; and a vertical correction section having first and second terminals between which a vertical deflection current flows, the vertical correction section including: a first vertical correction coil in a first current path between the first and second terminals; a second vertical correction coil in a second current path between the first and second terminals, the second current path being independent of the first current path; and a shared resistor commonly connected in parallel with the first and second current paths, wherein the first and second current paths selectively carry the vertical deflection current of first and second polarities respectively, and the first and second vertical correction coils generate a magnetic field in a second direction opposite from the first direction when the vertical deflection current of the first and second polarities flows through the first and second vertical correction coils respectively.

Preferably, according to a second aspect of the present invention, in the image distortion correction circuit of the first aspect, the vertical correction section further includes: a first diode in the first current path and connected in series with the first vertical correction coil; and a second diode in the second current path and connected in series with the second vertical correction coil, the first and second diodes being turned ON in response to the vertical deflection current of the first and second polarities, respectively.

Preferably, according to a third aspect of the present invention, in the image distortion correction circuit of the first or second aspect, the first and second diodes include a Schottky barrier diode.

Preferably, according to a fourth aspect of the present invention, in the image distortion correction circuit of any one of the first to third aspects, the vertical correction section further includes first and second damping sections connected in parallel with the first and second vertical correction coils respectively, the first damping section includes a first resistor and a first capacitor connected in series with each other, and the second damping section includes a second resistor and a second capacitor connected in series with each other.

As described hereinabove, the image distortion correction circuit of the first aspect of the present invention comprises the vertical correction section including the first and second vertical correction coils functioning to generate the magnetic field which cancels the magnetic fields biased by the magnetic field biasing means to change a combined inductance of the first and second horizontal correction coils, thereby achieving the correction of the amount of horizontal deflection in consideration for the amount of vertical deflection.

Consequently, the image distortion correction circuit of the first aspect can correct an intermediate pin distortion on the left and right sides of a screen (distortion such that, when applying an S-corrected sawtooth horizontal deflection current, the S-correction is more excessively made in upper and lower parts of the screen than in a central part thereof to bend vertical lines in an intermediate part into the shape of a pincushion).

Additionally, since a shared resistor portion including only the shared resistor serves as a current path, the resistance component of the vertical correction section at a current flowing time the vertical deflection current flows between the first and second terminals, equals the resistance of the shared resistor in the above-mentioned current path when the vertical deflection current flows in neither of the first and second current paths. The resistance component of the vertical correction section at said current flowing time equals the resistance of a parallel combined resistor including the shared resistor and a resistor in the first current path when the vertical deflection current flows in the first current path. The resistance component of the vertical correction section at said current flowing time equals the resistance of a parallel combined resistor including the shared resistor and a resistor in the second current path when the vertical deflection current flows in the second current path.

With this arrangement, a maximum resistance is the resistance of the single shared resistor. Therefore, the increase in the resistance of the resistance component of the vertical correction section is irreducibly minimized, and accordingly the degradation of vertical deflection sensitivity is minimized.

In the image distortion correction circuit of the second aspect of the present invention, the first and second diodes which are turned ON in response to the vertical deflection current of the first and second polarities allow the first and second current paths to selectively carry the vertical deflection current of the first and second polarities, respectively.

In the image distortion correction circuit of the third aspect of the present invention, the first and second diodes which include the Schottky barrier diode have a lower on-state resistance than ordinary diodes. This accordingly lower the resistance of the resistance component of the vertical correction section, to further suppress the degradation of the vertical deflection sensitivity.

The lowering of the on-state resistance of the first and second diodes lowers the resistance in the first and second current paths to increase the amount of current flowing in the first and second current paths relative to the amount of current flowing through the shared resistor. This increases the amount of current flowing through the first and second vertical correction coils to increase the amount of correction of horizontal deflection in the vertical correction section.

Additionally, since the Schottky barrier diode is lower in forward voltage than ordinary diodes, the shared resistor may have an accordingly lower resistance. Therefore, the degradation of the vertical deflection sensitivity is suppressed.

In the image distortion correction circuit of the fourth aspect of the present invention, the first and second damping sections connected respectively in parallel with the first and second vertical correction coils can reliably prevent deteriorating the accuracy of the vertical deflection current from the adverse effect of the interference of the horizontal deflection current flowing through the first and second horizontal correction coils upon the first and second vertical correction coils.

It is therefore an object of the present invention to provide an image distortion correction circuit capable of improving vertical deflection sensitivity over conventional circuits to perform an intermediate pin correction.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a circuit diagram showing a configuration of the image distortion correction circuit according to a second preferred embodiment of the present invention;

FIG. 4 is a circuit diagram showing a circuit configuration of the image distortion correction circuit according to a third preferred embodiment of the present invention.

DESCRIPTION OF THE PREFERRED EMBODIMENTS

<First Preferred Embodiment>

Figure 1:
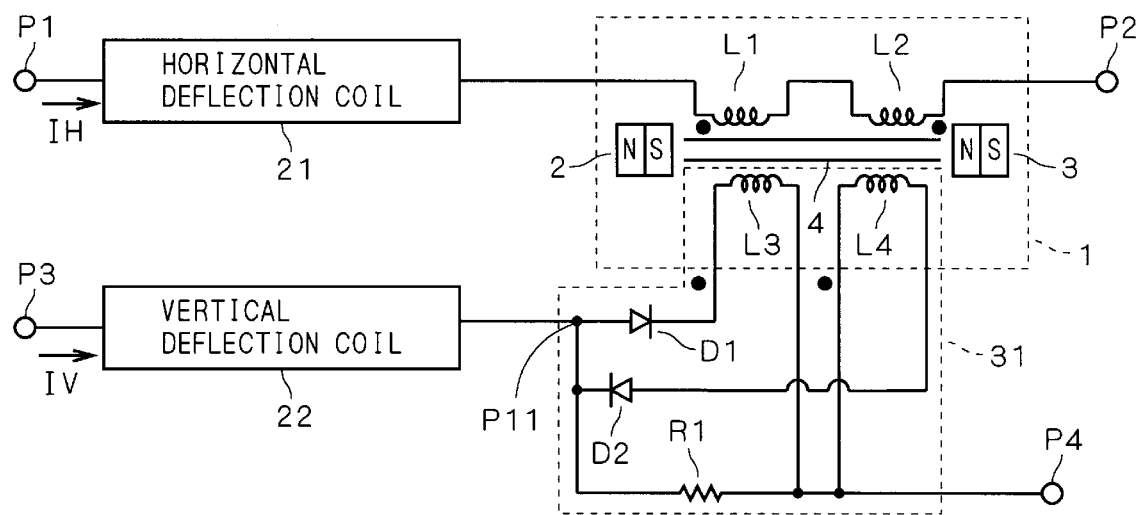
FIG. 1 is a circuit diagram showing a configuration of an image distortion correction circuit according to a first preferred embodiment of the present invention.

FIG. 1 is a circuit diagram showing a configuration of an image distortion correction circuit according to a first preferred embodiment of the present invention. Solid circles near coils L1 to L4 in FIG. 1 denote the beginning of winding which determines the direction of a magnetic field generated by a coil.

As shown in FIG. 1, a horizontal deflection current IH flows between terminals P1 and P2. A horizontal deflection coil 21, a horizontal correction coil L1 and a horizontal correction coil L2 are connected in series between the terminals P1 and P2. The horizontal correction coils L1 and L2 are wound on a core 4.

A vertical deflection current IV flows between terminals P3 and P4. A vertical deflection coil 22 is connected between the terminal P3 and an intermediate terminal P11.

A vertical correction section 31 including vertical correction coils L3, L4, diodes D1, D2 and a resistor R1 is connected between the intermediate terminal P11 and the terminal P4. The internal configuration of the vertical correction section 31 will be described below. The anode of the diode D1, the cathode of the diode D2 and a first end of the resistor R1 are connected to the intermediate terminal P11. A first end of the vertical correction coil L3 is connected to the cathode of the diode D1. A second end of the resistor R1 and the terminal P4 are connected to a second end of the vertical correction coil L3. A first end of the vertical correction coil L4 is connected to the terminal P4. A second end of the vertical correction coil L4 is connected to the anode of the diode D2. The vertical correction coils L3 and L4 are wound on the core 4.

A first current path (in which the diode D1 and the vertical correction coil L3 are connected in series) and a second current path (in which the diode D2 and the vertical correction coil L4 are connected in series) between the intermediate terminal P11 and the terminal P4 are commonly connected in parallel with the resistor R1 which is shared between the first and second current paths.

An intermediate pin distortion correction saturable reactor unit 1 comprises the above-mentioned horizontal correction coils L1, L2, the vertical correction coils L3, L4, magnets 2, 3, and the core 4. The pair of magnets 2 and 3 (magnetic field biasing means) disposed on opposite ends of the core 4 apply a biased magnetic field from the north pole toward the south pole (leftwardly of FIG. 1). The core 4 may be of an integral construction or divided into parts, if magnetically coupled. Each of the magnets 2 and 3 has the south pole at its first end and the north pole at its second end. Only one of the magnets 2 and 3 may be provided if a magnetic bias is applied to the core 4. Thus, an arrangement in which a single magnet is provided only on one side may be employed.

The two horizontal correction coils L1 and L2 are wound on the core 4 in respective directions such as to generate oppositely directed magnetic fields. The vertical correction coils L3 and L4 are wound in such a direction as to generate a magnetic field directed to cancel the biased magnetic field generated by the pair of magnets 2 and 3. The vertical correction coils L3 and L4 are wound on the same core 4 magnetically coupled to the horizontal correction coils L1 and L2. Specifically, when the vertical deflection current IV having a positive polarity selected by the diode D1 flows through the vertical correction coil L3, the vertical correction coil L3 generates a magnetic field directed to cancel the above-mentioned biased magnetic field. When the vertical deflection current IV having a negative polarity selected by the diode D2 flows through the vertical correction coil L4, the vertical correction coil L4 generates a magnetic field directed to cancel the above-mentioned biased magnetic field.

Figure 2:
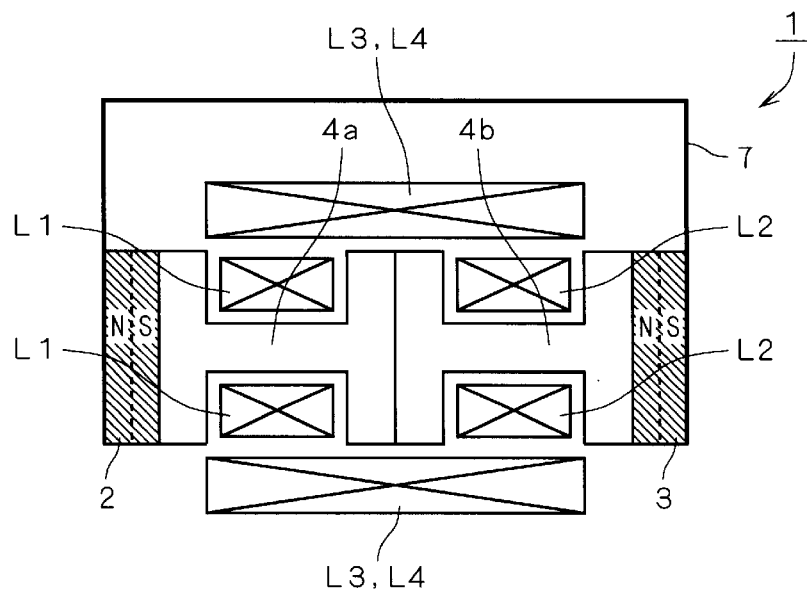
FIG. 2 shows a specific configuration of an intermediate pin distortion correction saturable reactor unit shown in FIG. 1.

FIG. 2 shows a specific structure of the intermediate pin distortion correction saturable reactor unit 1 shown in FIG. 1. The core 4 has partial cores 4a and 4b contacting each other so as to be magnetically coupled together. The magnets 2 and 3 are disposed on the opposite ends of the core 4 so that each of the magnets 2 and 3 has the south pole at its first end and the north pole at its second end. The magnets 2 and 3 are engaged in a yoke 7, and a magnetically closed loop is formed by the magnets 2, 3, the core 4 and the yoke 7. The intermediate pin distortion correction saturable reactor unit 1 may be constructed without using the yoke 7.

The horizontal correction coil L1 is wound on the partial core 4a, and the horizontal correction coil L2 is wound on the partial core 4b. The two horizontal correction coils L1 and L2 are wound in respective directions such as to generate oppositely directed magnetic fields. The horizontal correction coils L1 and L2 are connected in series as shown in FIG. 1.

The vertical correction coils L3 and L4 are wound concurrently (or wound in substantially the same configuration) on the horizontal correction coils L1 and L2 around the partial cores 4a and 4b. The vertical correction coils L3 and L4 are wound in such a direction as to generate a magnetic field directed to cancel the biased magnetic field generated by the magnets 2 and 3.

An equivalent circuit of the intermediate pin distortion correction saturable reactor unit 1 shown in FIG. 2 is the intermediate pin distortion correction saturable reactor unit 1 shown in FIG. 1. The intermediate pin distortion correction saturable reactor unit 1 may be used to correct an intermediate pin distortion on the left and right sides of a screen, as will be described later. The structure of the intermediate pin distortion correction saturable reactor unit 1 having a function shown in the equivalent circuit of FIG. 1 is not limited to that shown in FIG. 2.

In the image distortion correction circuit shown in FIG. 1, the horizontal deflection coil 21 and the vertical deflection coil 22 mean coils for a deflection yoke. The image distortion correction circuit of FIG. 1 is similar to the background art image distortion correction circuit in that the horizontal deflection current IH having an S-corrected sawtooth waveform and generated by a horizontal deflection circuit not shown for each horizontal scanning cycle is fed to the horizontal deflection coil 21 and in that the vertical deflection current IV having a sawtooth waveform and generated by a vertical deflection circuit not shown for each vertical scanning cycle is fed to the vertical deflection coil 22 for deflection of electron beams.

Currents obtained by rectifying the sawtooth vertical deflection current IV in the diodes D1 and D2 flow through the vertical correction coils L3 and L4, respectively. The polarity of the diodes D1 and D2 and the winding direction of the vertical correction coils L3 and L4 are determined so that current flows in such a direction as to cancel the biased magnetic field applied by the magnets 2 and 3.

Thus, when the vertical deflection current IV is positive in polarity, the diode D1 is ON to cause current to flow through the vertical correction coil L3, thereby canceling the biased magnetic field applied by the magnets 2 and 3. The vertical deflection current controls the magnetic saturation condition of the horizontal correction coils L1 and L2, and the inductance of the horizontal deflection is changed in accordance with the vertical cycle for the intermediate pin correction on the left and right sides of the screen. When the vertical deflection current IV is negative in polarity, the diode D2 is ON to perform an operation similar to that performed in the case of the positive polarity.

The image distortion correction circuit of the first preferred embodiment having the above-mentioned construction changes the inductance of the horizontal deflection (the combined inductance of the horizontal deflection coil 21 and the horizontal correction coils L1 and L2; directly the combined inductance of the horizontal correction coils L1 and L2) by the function of the vertical correction coils L3 and L4 carrying the vertical deflection current IV to generate the magnetic field directed to cancel the biased magnetic field applied by the magnets 2 and 3.

As a result, the horizontal deflection current IH varies in accordance with the change in inductance of the horizontal deflection. Therefore, the image distortion correction circuit of the first preferred embodiment can achieve the correction of the amount of horizontal deflection in consideration for the amount of vertical deflection to perform the intermediate pin distortion correction on the left and right sides of the screen.

The diodes D1 and D2 are shown in FIG. 1 as connected in series with the beginning and end of the windings of the vertical correction coils L3 and L4 respectively, but may be, of course, connected in series with the end and beginning of the windings of the vertical correction coils L3 and L4 respectively to produce similar effects.

The resistor R1 commonly connected in parallel with the vertical correction coils L3 and L4 and the diodes D1 and D2 generates a voltage which turns on the diodes D1 and D2. The resistances of the resistor R1 may be changed to control the starting point of the current flowing through the vertical correction coils L3 and L4.

Figure 5:
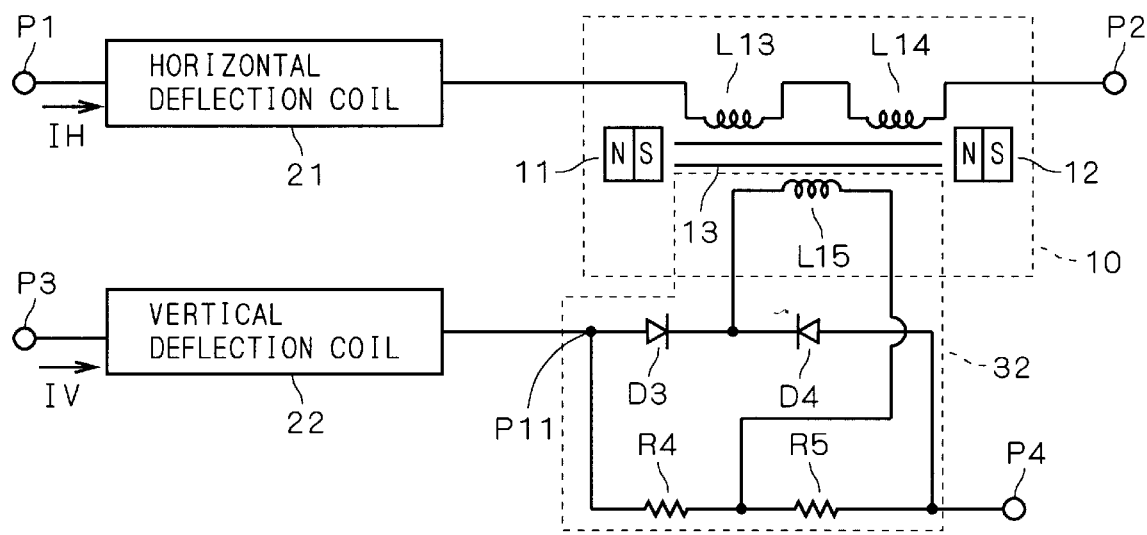
FIG. 5 is a circuit diagram showing a circuit configuration of a background art intermediate pin distortion correction device.

In the background art intermediate pin distortion correction device (image distortion correction circuit) shown in FIG. 5, (the resistance of) the impedance of the vertical correction section 32 equals the sum of the resistance of the resistor R4 and the resistance of the resistor R5 when the diodes D3 and D4 are OFF. The impedance of the vertical correction section 32 when the diode D3 is ON equals the sum of the resistance of a first combined resistor and the resistance of the resistor R5. The first combined resistor means a parallel resistor including a series-connected resistor having the on-state resistance of the diode D3 and the vertical correction coil L15, and the resistor R4.

Likewise, when the diode D4 is ON, the impedance of the vertical correction section 32 equals the sum of the resistance of a second combined resistor and the resistance of the resistor R4. The second combined resistor means a parallel resistor including a series-connected resistor having the on-state resistance of the diode D4 and the vertical correction coil L15, and the resistor R5.

If the resistances of the first and second combined resistors are at a level low enough to be neglected, the impedance of the circuit carrying the vertical deflection current IV (abbreviated as "vertical impedance" hereinafter) in the presence of the vertical correction section 32 is lower than that in the absence of the vertical correction section 32 by the amount of the resistance of the resistor R5 when the diode D3 is ON. The vertical impedance in the presence of the vertical correction section 32 is lower than that in the absence of the vertical correction section 32 by the amount of the resistance of the resistor R4 when the diode D4 is ON. As a result, the vertical deflection sensitivity is lowered.

In the image distortion correction device of the first preferred embodiment, on the other hand, the impedance of the vertical correction section 31 when the diodes D1 and D2 are both OFF equals the resistance of the resistor R1. The impedance of the vertical correction section 31 when the diode D1 is ON equals the resistance of a parallel resistor (third combined resistor) including a series-connected resistor having the on-state resistance of the diode D1 and the resistance of the vertical correction coil L3, and the resistor R1. Similarly, the impedance of the vertical correction section 31 when the diode D2 is ON equals the resistance of a parallel resistor (fourth combined resistor) including a series-connected resistor having the on-state resistance of the diode D2 and the resistance of the vertical correction coil L4, and the resistor R1. Therefore, the vertical impedance is improved over the background art vertical impedance.

Thus, the image distortion correction circuit of the first preferred embodiment significantly decreases the impedance of the vertical correction section 31, as compared with the impedance of the vertical correction section 32 of the background art intermediate pin distortion correction device shown in FIG. 5, to greatly improve the vertical deflection sensitivity.

For example, it is assumed that the resistor R1 and the resistors R4, R5 are equal in resistance (assumed to be designated by "R0"), the vertical correction coils L3, L4 and the vertical correction coil L15 are equal in resistance, and the diodes D1, D2 and the diodes D3, D4 are equal in on-state resistance. Then, the resistance of the first and second combined resistors equals the resistance of the third and fourth combined resistors. Therefore, the impedance is lowered by the amount of the resistance R0, as compared with the resistance of the vertical correction section 32 shown in FIG. 5 in either of the cases where the diodes D1 (D3) and D2 (D4) are both OFF and where one is ON and the other is OFF, whereby the vertical deflection sensitivity is improved.

<Second Preferred Embodiment>

FIG. 3 is a circuit diagram showing a configuration of the image distortion correction circuit according to a second preferred embodiment of the present invention. As shown in FIG. 3, the second preferred embodiment employs Schottky barrier diodes D11 and D12 in place of the diodes D1 and D2 of the first preferred embodiment. Other constituents of the second preferred embodiment are similar to those of the first preferred embodiment shown in FIGS. 1 and 2, and are not particularly described.

In the image distortion correction circuit of the first preferred embodiment shown in FIG. 1, since the rectifier circuit (including the diodes D1, D2 and the resistor R1) associated with the vertical correction coils L3 and L4 is connected in series with the vertical deflection coil 22, the impedance of the vertical correction section 31 directly affects the vertical deflection sensitivity.

As discussed above, when the diode D1 is ON, an increase in vertical impedance equals the parallel combined resistance (third combined resistor) including the series-connected combined resistor having the on-state resistance of the diode D1 and the resistance of the vertical correction coil L3, and the resistor R1.

The image distortion correction circuit of the second preferred embodiment comprises the Schottky barrier diodes D11 and D12 in place of the diodes D1 and D2, as shown in FIG. 3. Schottky barrier diodes have a lower on-state resistance than ordinary diodes, and are widely used as rectifier diodes. The use of the Schottky barrier diodes D11 and D12 having such a characteristic in place of the diodes D1 and D2 decreases the on-state resistance to improve the impedance, thereby improving the vertical deflection sensitivity over the first preferred embodiment.

Additionally, the Schottky barrier diodes have a lower forward voltage for a forward current than ordinary diodes to allow the decrease in the resistance of the resistor R1 functioning to generate the voltage which turns on the diodes. The decrease in the resistance of the resistor R1 decreases the impedance, as compared with the image distortion correction circuit of the first preferred embodiment, in either of the cases where the diode D11 (D12) is OFF and where it is ON, thereby improving the vertical deflection sensitivity.

When the Schottky barrier diodes are used and the resistor R1 has the same resistance as when ordinary diodes are used, the ratio between the current flowing through the resistor R1 and the current flowing through the vertical correction coil L3 (L4) changes and more current can flow through the vertical correction coil L3 (L4) because of the lower on-state resistance of the Schottky diodes than the ordinary diodes. This increases the amount of correction of the horizontal deflection current IH by the vertical correction coil L3 (L4). Furthermore, the improvement in the on-state resistance of the Schottky barrier diodes D11 and D12 themselves accordingly decreases the impedance to improve the vertical deflection sensitivity.

<Third Preferred Embodiment>

FIG. 4 is a circuit diagram showing a circuit configuration of the image distortion correction circuit according to a third preferred embodiment of the present invention.

As shown in FIG. 4. a resistor R8 and a capacitor C1 are connected in series between the first and second ends of the vertical correction coil L3, and a resistor R9 and a capacitor C2 are connected in series between the first and second ends of the vertical correction coil L4. Other constituents of the third preferred embodiment are similar to those of the first preferred embodiment shown in FIG. 1, and are not particularly described.

The vertical correction coils L3 and L4 are wound on the common core 4 concurrently with the horizontal correction coils L1 and L2. This causes a horizontal component (horizontal deflection current IH) to interfere with the vertical correction coils L3 and L4. The presence of the horizontal component in the vertical deflection current IV might inhibit the attainment of expected performance (vertical deflection characteristic).

To prevent such a disadvantage, the image distortion correction circuit of the third preferred embodiment comprises a first damping section including the series connection between the resistor R8 and the capacitor C1 and connected in parallel with the vertical correction coil L3, and a second damping section including the series connection between the resistor R9 and the capacitor C2 and connected in parallel with the vertical correction coil L4. The damping effect (the effect of removing a higher frequency horizontal component than the vertical deflection current IV) of the first and second damping sections (the resistors R8, R9 and the capacitors C1, C2) can suppress the degradation of the performance.

If the above-mentioned performance degradation phenomenon does not occur, the image distortion correction circuit may be constructed without the resistors R8, R9 and the capacitors C1, C2. The resistors R8, R9 and the capacitors C1, C2, if only connected in parallel with the vertical correction coils L3 and L4, produce similar effects independently of the winding direction of the vertical correction coils L3, L4 and the sequence of the series connections. The image distortion correction circuit may comprise only the resistors R8 and R9 without employing the capacitors C1 and C2 or comprise only the capacitors C1 and C2 without employing the resistors R8 and R9.

Although the image distortion correction circuit of FIG. 4 has the resistors R8, R9 and the capacitors C1, C2 which are additionally connected to the circuit configuration of the first preferred embodiment shown in FIG. 1, the resistors R8, R9 and the capacitors C1, C2 may be, of course, additionally connected to the circuit configuration of the second preferred embodiment shown in FIG. 3.

While the invention has been described in detail, the foregoing description is in all aspects illustrative and not restrictive. It is understood that numerous other modifications and variations can be devised without departing from the scope of the invention.

What is claimed is:

1. An image distortion correction circuit comprising:

first and second horizontal correction coils in a horizontal deflection current path through which a horizontal deflection current flows, said first and second horizontal correction coils being connected in series with each other and being wound in such directions as to generate oppositely directed magnetic fields respectively;

magnetic field biasing means for biasing said magnetic fields in a first direction; and a vertical correction section having first and second terminals between which a vertical deflection current flows, said vertical correction section including:
  a first vertical correction coil in a first current path between said first and second terminals;
  a second vertical correction coil in a second current path between said first and second terminals, said second current path being independent of said first current path; and
  a shared resistor commonly connected in parallel with said first and second current paths, wherein
  said first and second current paths selectively carry said vertical deflection current of first and second polarities respectively, and
  said first and second vertical correction coils generate a magnetic field in a second direction opposite from said first direction when said vertical deflection current of said first and second polarities flows through said first and second vertical correction coils respectively.

2. The image distortion correction circuit according to claim 1, wherein
  said vertical correction section further includes:
    a first diode in said first current path and connected in series with said first vertical correction coil; and
    a second diode in said second current path and connected in series with said second vertical correction coil,
    said first and second diodes being turned ON in response to said vertical deflection current of said first and second polarities, respectively.

3. The image distortion correction circuit according to claim 1, wherein
  said first and second diodes include a Schottky barrier diode.

4. The image distortion correction circuit according to claim 1, wherein
  said vertical correction section further includes
  first and second damping sections connected in parallel with said first and second vertical correction coils respectively,
    said first damping section includes a first resistor and a first capacitor connected in series with each other, and
    said second damping section includes a second resistor and a second capacitor connected in series with each other.

5. The image distortion correction circuit according to claim 1, wherein
  said first and second horizontal correction coils and said first and second vertical correction coils include coils wound on a common core.

* * * * *